United States Patent
Fischmann

(10) Patent No.: US 11,732,493 B2
(45) Date of Patent: *Aug. 22, 2023

(54) URBAN TRANSFORMATION AND CONSTRUCTION METHOD FOR CREATING A PUBLIC ACCESS TROPICAL STYLE SWIMMING LAGOON WITH BEACHES WITHIN VACANT OR ABANDONED SITES

(71) Applicant: CRYSTAL LAGOONS TECHNOLOGIES, Inc., Miami, FL (US)

(72) Inventor: Fernando Benjamin Fischmann, Coral Gables, FL (US)

(73) Assignee: CRYSTAL LAGOONS TECHNOLOGIES, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,328

(22) Filed: Jun. 28, 2021

(65) Prior Publication Data
US 2021/0324646 A1 Oct. 21, 2021

Related U.S. Application Data

(63) Continuation of application No. 16/725,998, filed on Dec. 23, 2019, now Pat. No. 11,098,495, which is a
(Continued)

(51) Int. Cl.
*E04H 4/00* (2006.01)
*E02D 17/00* (2006.01)
(Continued)

(52) U.S. Cl.
CPC .............. *E04H 4/00* (2013.01); *E02D 17/00* (2013.01); *E04H 3/02* (2013.01); *E04H 3/12* (2013.01);
(Continued)

(58) Field of Classification Search
CPC .. E04H 4/148; E04H 3/02; E04H 3/12; E04H 4/144; E04H 4/00; E04H 17/00;
(Continued)

(56) References Cited

U.S. PATENT DOCUMENTS

| 483,600 A | 10/1892 | Butler |
| 1,657,598 A | 1/1928 | Whitman |

(Continued)

FOREIGN PATENT DOCUMENTS

| CN | 1214402 A | 4/1999 |
| CN | 1367300 A | 9/2002 |

(Continued)

OTHER PUBLICATIONS

Baskas, Harriet, Surfs Up At Munich Airport, <https://stuckattheairport.com/2014/07/12/surfs-up-at-munich-airport-2/> (2014).
(Continued)

*Primary Examiner* — Brent W Herring
(74) *Attorney, Agent, or Firm* — Merchant & Gould P.C.

(57) ABSTRACT

An urban transformation and construction method is disclosed that creates a tropical style swimming lagoon at vacant and/or abandoned sites. The transformation includes demolishing at least part of the vacant or abandoned site, excavating material from within the site; forming a basin for a large water body having a surface area of at least 3,000 m2, and constructing water containment walls on a first section of the basin to form a waterfront perimeter. The shape of the waterfront perimeter is mainly curved, the basin has a maximum width of 300 meters, and the bottom is covered with a non-permeable material. A sloped access area is constructed in a second section of the basin to form a beach. A barrier is constructed to control access into the area including the beach. At least one recreational facility is
(Continued)

constructed including restaurants, bars, kiosks, stores, and/or cafes about the waterfront perimeter.

46 Claims, 4 Drawing Sheets

Related U.S. Application Data continuation-in-part of application No. 16/538,273, filed on Aug. 12, 2019, now Pat. No. 10,724,260.

(60) Provisional application No. 62/785,086, filed on Dec. 26, 2018.

(51) Int. Cl.
    *E04H 3/22*          (2006.01)
    *E04H 3/02*          (2006.01)
    *G06Q 50/08*         (2012.01)
    *E04H 4/14*          (2006.01)
    *E04H 3/12*          (2006.01)
    *G06Q 20/04*         (2012.01)
    *G06Q 50/16*         (2012.01)

(52) U.S. Cl.
CPC ............... *E04H 3/22* (2013.01); *E04H 4/144* (2013.01); *E04H 4/148* (2013.01); *G06Q 50/08* (2013.01); *E04H 2004/146* (2013.01); *G06Q 20/045* (2013.01); *G06Q 50/165* (2013.01)

(58) Field of Classification Search
CPC .. E04H 2004/146; E04H 3/22; G06Q 50/165; G06Q 50/08; G06Q 20/045; G06Q 10/04
USPC ......... 52/169.1, 169.7, 169.8, 741.11, 742.1, 52/742.14
See application file for complete search history.

(56) References Cited

U.S. PATENT DOCUMENTS

| | | | |
|---|---|---|---|
| 2,071,520 | A | 2/1937 | Harrison |
| 3,596,996 | A * | 8/1971 | Carter .................... E02F 3/962 299/24 |
| 3,673,751 | A | 7/1972 | Boassy et al. |
| 3,695,434 | A | 10/1972 | Whitten, Jr. |
| 3,739,539 | A | 6/1973 | Posnick |
| 3,823,690 | A | 7/1974 | Rynberk |
| 3,832,814 | A | 9/1974 | Teschner |
| 3,990,250 | A | 11/1976 | Howard |
| 4,263,759 | A | 4/1981 | Miller |
| 4,686,799 | A | 8/1987 | Kwake |
| 4,843,658 | A | 7/1989 | Hodak |
| 4,976,088 | A | 12/1990 | Powers |
| 5,139,853 | A | 8/1992 | Mathieson et al. |
| 5,143,623 | A | 9/1992 | Kroll |
| 5,800,272 | A | 9/1998 | Pons |
| 6,168,532 | B1 | 1/2001 | McCaffrey |
| 6,317,901 | B1 | 11/2001 | Corpuel |
| 6,764,139 | B1 | 7/2004 | Wortman |
| 7,036,449 | B2 | 5/2006 | Sutter |
| 7,717,569 | B2 | 5/2010 | Sokeila et al. |
| 7,820,055 | B2 | 10/2010 | Fischmann Torres |
| 8,062,514 | B2 | 11/2011 | Fischmann Torres |
| 8,070,942 | B2 | 12/2011 | Fischmann Torres |
| 8,347,556 | B2 | 1/2013 | Stelmaszek et al. |
| 8,454,838 | B2 | 6/2013 | Fischmann T. |
| 8,465,651 | B2 | 6/2013 | Fischmann T. |
| 8,518,269 | B2 | 8/2013 | Fischmann T. |
| 8,544,220 | B2 | 10/2013 | Milani |
| 8,555,557 | B2 | 10/2013 | Hosking et al. |
| 8,753,520 | B1 | 6/2014 | Fischmann |
| 8,790,518 | B2 | 7/2014 | Fischmann Torres |
| 9,051,193 | B2 | 6/2015 | Fischmann T. |
| 9,062,471 | B2 | 6/2015 | Fischmann T. |
| 9,080,342 | B2 | 7/2015 | Fischmann T. |
| 9,470,007 | B2 | 10/2016 | Fischmann Torres |
| 9,470,008 | B2 | 10/2016 | Fischmann |
| 9,708,822 | B2 | 7/2017 | Fischmann Torres |
| 9,957,693 | B2 | 5/2018 | Fischmann Torres et al. |
| 10,072,430 | B2 | 9/2018 | Nasibov |
| 10,358,837 | B2 | 7/2019 | Khamis et al. |
| 10,428,542 | B1 | 10/2019 | Jackson et al. |
| 10,472,839 | B2 | 11/2019 | Khamis et al. |
| 10,486,074 | B2 | 11/2019 | Fischmann |
| 10,521,870 | B2 | 12/2019 | Fischmann |
| 10,724,260 | B2 | 7/2020 | Fischmann |
| 10,994,215 | B2 | 5/2021 | Fischmann |
| 10,997,683 | B2 | 5/2021 | Fischmann |
| 10,997,684 | B2 | 5/2021 | Fischmann |
| 11,015,333 | B2 | 5/2021 | Fischmann |
| 2001/0018370 | A1 | 8/2001 | Arie |
| 2003/0228195 | A1 | 12/2003 | Mizutani |
| 2007/0181498 | A1 | 8/2007 | Kaas |
| 2007/0196173 | A1 | 8/2007 | Shehan |
| 2007/0248414 | A1 | 10/2007 | Fratianni |
| 2008/0021776 | A1 | 1/2008 | Lochtefeld |
| 2008/0116142 | A1 | 5/2008 | Fischmann Torres |
| 2008/0127574 | A1 | 6/2008 | Yi |
| 2010/0146869 | A1 | 6/2010 | Stelmaszek et al. |
| 2011/0108490 | A1 | 5/2011 | Fischmann Torres |
| 2012/0024796 | A1 | 2/2012 | Fischmann T. |
| 2012/0061967 | A1 | 3/2012 | Chaganti et al. |
| 2012/0102874 | A1 | 5/2012 | Milani |
| 2012/0131861 | A1 | 5/2012 | Hosking et al. |
| 2012/0255113 | A1 | 10/2012 | Osterman et al. |
| 2013/0074254 | A1 | 3/2013 | Payne et al. |
| 2014/0228138 | A1 | 8/2014 | Scott |
| 2015/0125212 | A1 | 5/2015 | Fischmann |
| 2015/0166361 | A1 | 6/2015 | Fischmann |
| 2015/0240506 | A1 | 8/2015 | Ruhmann et al. |
| 2016/0177586 | A1 | 6/2016 | Nasibov |
| 2019/0169867 | A1 | 6/2019 | Khamis et al. |
| 2019/0169870 | A1 | 6/2019 | Khamis et al. |
| 2019/0232180 | A1 | 8/2019 | Fischmann |
| 2019/0236744 | A1 | 8/2019 | Fischmann |
| 2019/0355083 | A1 | 11/2019 | Fischmann |
| 2020/0023281 | A1 | 1/2020 | Fischmann |
| 2020/0023282 | A1 | 1/2020 | Fischmann |
| 2020/0027186 | A1 | 1/2020 | Fischmann |
| 2020/0032502 | A1 | 1/2020 | Fischmann |
| 2020/0032503 | A1 | 1/2020 | Fischmann |
| 2020/0047076 | A1 | 2/2020 | Fischmann |
| 2020/0051057 | A1 | 2/2020 | Fischmann |
| 2020/0074577 | A1 | 3/2020 | Fischmann |
| 2020/0074579 | A1 | 3/2020 | Fischmann |
| 2020/0208423 | A1 | 7/2020 | Fischmann |
| 2020/0208424 | A1 | 7/2020 | Fischmann |
| 2020/0208425 | A1 | 7/2020 | Fischmann |
| 2022/0178159 | A1 * | 6/2022 | Casadio .................... E04H 4/00 |

FOREIGN PATENT DOCUMENTS

| | | |
|---|---|---|
| CN | 1865631 A | 11/2006 |
| EP | 1 561 495 A1 | 8/2005 |
| JP | 2002-309539 A | 10/2002 |
| WO | 2006/116745 A2 | 11/2006 |

OTHER PUBLICATIONS

Beaches Negril, Beaches Resorts by Sandals <https://www.beaches.com/resorts/negril/maps/> (Year: 2020).

Busbee, Jay, The wild, weird stories of Lake Lloyd at Daytona International Speedway, <https://sports.yahoo.com/blogs/nascar-from-the-marbles/the-wild--weird-stories-of-lake-lloyd-at-daytona-international-speedway-220533641.html> (Year: 2015).

Challenge Daytona, <https://challenge-daytona.com/challengedaytona-swim/> (Year: 2020).

Crystal Lagoons, Crystal Lagoons at Epperson Groundbreaking with Review Masterplan, https://www.youtube.com/watch?v=U6ev1uFZ8XM, 2 pages (Jul. 25, 2017).

(56) References Cited

OTHER PUBLICATIONS

Daytona International Speedway, Wikipedia, https://web.archive.org/web/20180912065408/https://en.wikipedia.org/wiki/Daytona_International_Speedway, 14 pages (Sep. 9, 2018).

Gameng, Monica, Construction of URBNSurf Melbourne to support 300 jobs, <https://blog.plantminer.com.au/construction-of-urbnsurf-melbourne-to-support-300-jobs>, Feb. 23, 2018 (Year: 2018).

Geico Camping, <https://www.daytonainternationalspeedway.com/Events/2019/Circle-K-Firecracker-250/GEICO-Camping.aspx> (Year: 2020).

International Search Report and Written Opinion for Application No. PCT/IB2018/001089 dated Jan. 17, 2019.

International Search Report and Written Opinion for Application No. PCT/IB2018/001084 dated Jan. 29, 2019.

International Search Report and Written Opinion for Application No. PCT/IB19/00919 dated Feb. 12, 2020.

International Search Report and Written Opinion for Application No. PCT/US2019/068419 dated Mar. 4, 2020.

International Search Report and Written Opinion for Application No. PCT/US19/68410 dated Mar. 24, 2020.

International Search Report and Written Opinion for Application No. PCT/US19/68414 dated Apr. 1, 2020.

Jamindan, Blue Oyzer Cult Santa Cruz CA Boardwalk, https://www.youtube.com/watch?v=XScGHOPS8g0, 2 pages (Aug. 25, 2012).

Maps, Daytona International Speedway, <https://www.daytonainternationalspeedway.com/Plan-Your-Visit/Maps.aspx> (Year: 2020).

Martinelli, Michelle, Why NASCAR's Daytona track has its own massive lake, <https://ftw.usatoday.com/2019/02/nascar-daytona-500-lake-lloyd-truex-bowyer> (Year: 2019).

Pitz, Taylor, Huntington Beach Responds with Reforms for US Open of Surfing 2014, <https://www.theinertia.com/surf/the-us-open-of-surfing-2014/>, referred to herein as "Huntington Beach Surf Comp" (2013).

"Public Access Lagoons" (Crystal Lagoons) retrieved from https://web.archive.org/web/20180727155828/https://www.crystal-lagoons.com/public-access-lagoons/>, 1 page (Jul. 27, 2018).

Rentafloat by Europonton GmbH <https://www.rentafloat.eu/en/pontoon-systems/floating-stages> (Year: 2017).

Six Flags Great America, https://www.sixflags.com/greatamerica/attractions/water-park-rides, 1 page (Dec. 16, 2018).

Six Flags Great America, Wikipedia, https://en.wikipedia.org/wiki/Six_Flags_Great_America, 26 pages (Feb. 18, 2020).

"Treasure Bay Bintan" [online] Retrieved from the Internet: <URL: https://www.treasurebaybintan.com>, copyright 2016, 12 pages.

URBNSurf https://urbnsurf.com/parkoverview>, accessed 2020 (Year: 2020).

URBNSurf, "Welcome To URBNSurf". Retrieved from the Internet: <URL:https://www.facebook.com/urbnsurf/videos/177300867624-5450/>, published on Facebook on Jun. 8, 2016, 2 pages.

URBNSurf You tube video, <https://www.youtube.com/watch?time_continue=64&v=tH2MLBdea5g&feature=emb_logo>, published Feb. 21, 2018 (2018).

* cited by examiner

URBAN TRANSFORMATION AND CONSTRUCTION METHOD FOR CREATING A PUBLIC ACCESS TROPICAL STYLE SWIMMING LAGOON WITH BEACHES WITHIN VACANT OR ABANDONED SITES

This application is a continuation of U.S. patent application Ser. No. 16/725,998, filed Dec. 23, 2019, which is a Continuation-in-Part of U.S. patent application Ser. No. 16/538,273, filed Aug. 12, 2019, now U.S. Pat. No. 10,724,260, which claims benefit of U.S. Provisional Ser. No. 62/785,086, filed Dec. 26, 2018 and which applications are incorporated herein by reference. To the extent appropriate, a claim of priority is made to each of the above disclosed applications.

FIELD OF THE INVENTION

The present invention relates generally to an urban transformation and construction method for creating a public access tropical-style swimming lagoon with turquoise crystal clear waters within vacant or abandoned sites, for swimming and the practice of water sports, wherein a portion of the vacant site is demolished in order to generate a swimming lagoon. Preferably, there is at least an area of the swimming lagoon where public access is controlled, and a beach area is located within the controlled access area.

BACKGROUND OF THE INVENTION

Around the world, as cities and urban spaces keep growing, a series of vacant and/or abandoned sites have been left in between all this urban development, which may be vacant or abandoned due to limited uses.

As a reference, it has been estimated that in the U.S., on average, fifteen percent of a city's land is deemed vacant, including varying types of land, ranging from undisturbed open space to abandoned, contaminated brownfields (Pagano et al, 2000). This is especially true for cities on the south of the U.S., with more than 19% of its land deemed vacant, which is mostly due to cities that have experienced high levels of population and land area growth. While cities expand, there are a lot of lots and spaces that are left undeveloped, and end up becoming vacant land. On average in the U.S., cities had 12,367 acres of usable vacant land, with a median amount of usable vacant land of 4,499 acres.

Generally, it has been considered that vacant lots are associated with depressed real estate value, crime, trash, abandonment, poor landscape, and general economic and/or social failure, where vacant lots tend to be perceived very negatively. Vacant lots can devastate a neighborhood, undermine the neighbors' quality of life, diminish the value of nearby properties, and reduce local tax revenue. In this aspect, it has been studied that vacant and abandoned properties have increased crime rates and declining property values, in addition to the fact that their maintenance or demolition (for abandoned structures) has a high cost that has to be paid by the cities.

Some vacant land sites are sites that have been projected for the construction of public parks, categorized for open space recreation or green areas, but have not been developed and result in abandoned and desert sites. In addition to strictly vacant land, green spaces, such as public parks that are underutilized or that are not maintained properly can also be considered as relatively vacant land as they have the same negative effects on the community.

It has been studied that the reuse of vacant land and abandoned structures can represent an opportunity for the economic growth and recovery of a diverse range of urban areas. This is true for all cities, independently of population and city size.

As used herein, vacant and/or abandoned sites refer to sites and/or lots that not only are vacant or have abandoned structures but it also includes parks or sites that have limited uses or sites that have constructive limitations. For example, this can represent green areas of private projects with low use and land that does not allow constructing high rises or tall buildings, very low usage density lots, or land that requires of very long permitting and approval processes to transform into real estate or commercial projects, among others.

For example, thousands of abandoned and/or vacant sites have been converted to community gardens and parks. The relatively trending phenomenon called "greening" consists of transforming vacant lots into green spaces that are environmentally friendly, with final uses as community gardens and tree farms for example. The transformation of vacant land could provide increased green space for urban gardening and recreation, as well as other uses for urban relief.

The requirement for these types of green areas has grown over the years, while population in urban locations keeps growing and therefore needs of open-air locations that can provide a relaxing setting as well as allowing to perform recreational activities such as running, exercising, among others. In general, these green spaces also have positive effects over its surroundings, such as for example increasing the value of surrounding real estate and the development of new markets (for example commercial development nearby parks), as well as improving health of users and having environmental benefits, which is the complete opposite of the negative effects created by vacant or abandoned lots.

Cities that have increased urban development and with high population concentration could greatly benefit of the transformation of such vacant or abandoned lots, especially since they have few opportunities for new green space development through other means. However, the transformation of vacant or abandoned sites into community spaces has not taken off considerably, not taking advantage of these underutilized spaces to improve urban quality of life and that also have positive environmental effects. Many of the transformation alternatives, including gardens and similar, have not succeeded considerably, and a large number of vacant and/or abandoned sites still exists around the world.

The stress in large cities and urban lifestyle has a large impact on people, who therefore look for different settings and lifestyle to relax. In this same point, it is important to mention that there has been an explosive increase in worldwide tourism over the years that has substantially increased its carbon footprint (See FIG. 1 that shows the increase of tourists over the years). This is mainly because people have to travel long distances and use their car, or have to fly, or use other transport means to be able to reach waterfront settings and beach areas, sometimes having to travel hundreds of miles to be a part of a beautiful waterfront beach setting, in result having a very large carbon footprint due to all of this movement. This is especially relevant today, where society has become very aware of carbon footprint, where travel is one of the big contributors of carbon emissions.

With urban locations being very hectic and stressful, the urban population is having increasing demands for open recreational spaces where they can relax, practice sports, and enjoy of beautiful scenery and spaces. Congregation spaces are scarce, and the old tradition of congregating in shopping malls or retail facilities has shifted into a search for open and natural settings.

Therefore, there are many current vacant and/or abandoned spaces that are poorly used or have limited uses, that are relatively well connected urban locations, and that do not have aesthetical features sought out by people such as recreational uses and beautiful settings.

SUMMARY

Therefore, according to one embodiment there is provided an urban transformation construction method for creating a tropical-style swimming lagoon with a sloped access at vacant and/or abandoned sites, the method comprising: demolishing at least part of the vacant or abandoned site, wherein the demolition process includes excavating at least a 15 cm to 6 meter layer; excavating material having a volume of at least 4,000 m3 from an area within the site; forming a basin for a large water body having a surface area of at least 3,000 m2 and a minimum depth of at least 1.4 meters at its deepest point, wherein earthworks for the basin are created within the surrounding site perimeter, and wherein the basin includes a basin perimeter and a bottom; constructing water containment walls on at least one section of the basin perimeter to form a waterfront perimeter, wherein the shape of the waterfront perimeter is mainly curved and the basin has a maximum width of 300 meters; covering the bottom of the basin with a non-permeable material not including thick concrete like conventional swimming pools; constructing a sloped access area on at least one section of the basin perimeter to form a beach access into the large water body; constructing one or more barriers around the basin perimeter to cordon off an area to establish a controlled access area, wherein the controlled access area includes a beach access perimeter, and the barriers include at least one access point to selectively allow users into the controlled access area, whereby the users allowed entry into the controlled access area are able to use the beach access; and constructing at least one additional recreational facility comprising food and beverage and commercial facilities such as restaurants, bars, kiosks, stores, cafes among others in the vicinity of the waterfront perimeter.

These and other variations of the invention will become apparent to those skilled in the art upon a more detailed description of the invention. The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

DESCRIPTION OF THE FIGURES

Referring to the drawings, wherein like numerals represent like parts throughout the several views:

FIG. 4 shows a side view of another embodiment of the containment walls 6 for the basin of the swimming lagoon 2, showing backfill material 7 to provide structural stability to the containment wall, and wherein a non-permeable material 9 contains the water within the large water body, and is located on top of the bottom soil 8. FIG. 5 illustrates an embodiment in which the depth of the lagoon 2 near the wall is relatively deep.

FIG. 5 shows a side view of an embodiment of a sloped access 5 to the basin of the swimming lagoon 2, wherein a support slab 10 is provided underneath a portion of the sloped access 5, and the non-permeable material 9 for containing the water in the large water body.

DETAILED DESCRIPTION OF THE INVENTION

Figure 1:
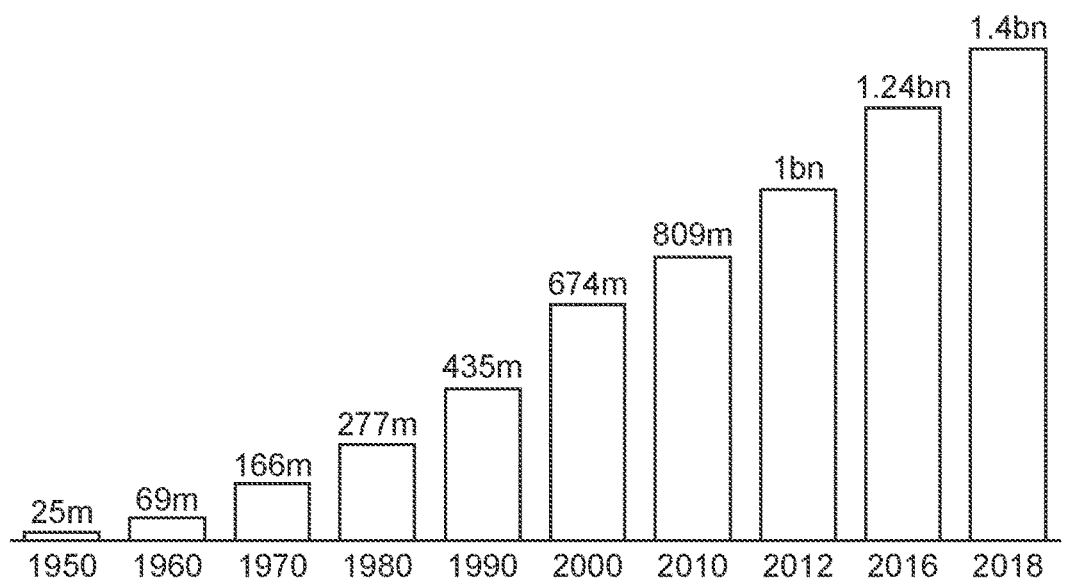
FIG. 1 shows the number of international tourist arrivals given by the World Tourism Organization in 2017, referring to the number of inbound journeys by international tourists to a country outside the destination they live in for a duration of less than a year.
Figure 2:
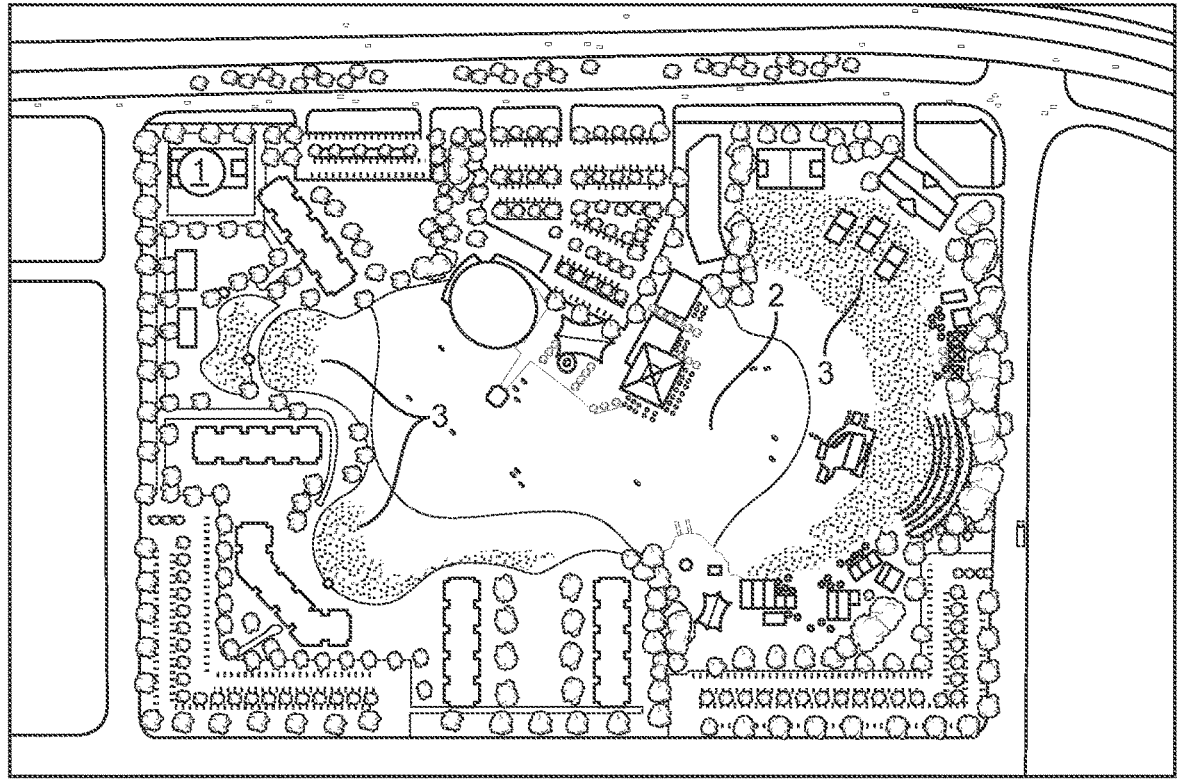
FIG. 2 shows an aerial view of an embodiment of the invention after applying the method from the present invention that allows to transform an urban location such as a vacant or abandoned site (1) into an urban beach where a tropical-style swimming lagoon (2) can be seen, having at least one beach area (3).
Figure 3:
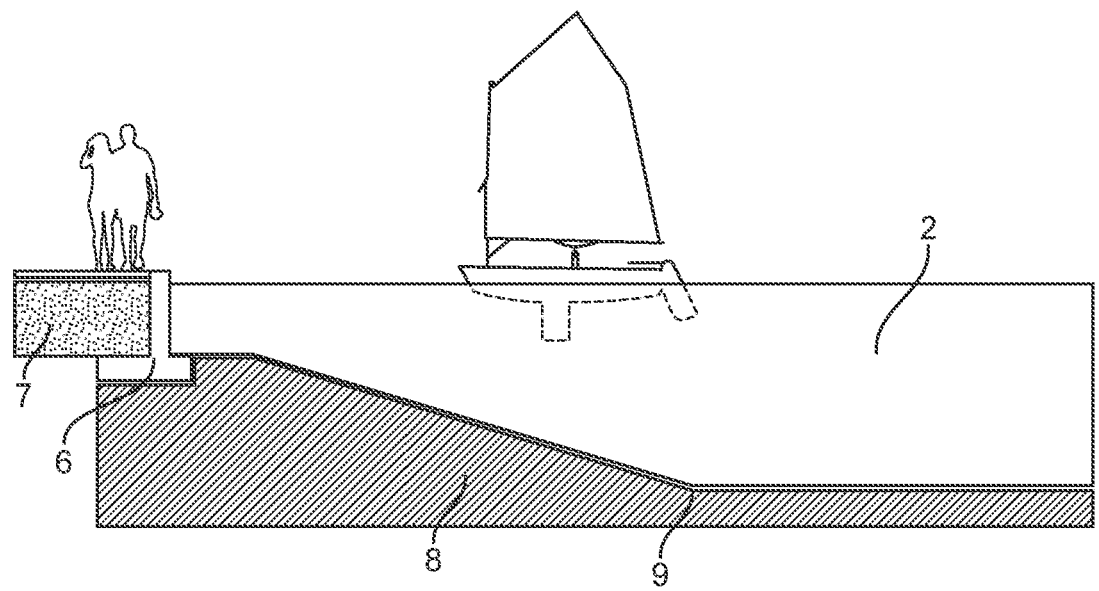
FIGS. 3 and 4 show side views of embodiments of the containment walls 6 for the basin of the swimming lagoon 2. First referring to FIG. 2, backfill material 7 is included to provide structural stability to the containment wall 6. A non-permeable material 9 contains the water in the large water body (e.g., the swimming lagoon 2), and is located on top of the bottom soil 8.
Figure 4:
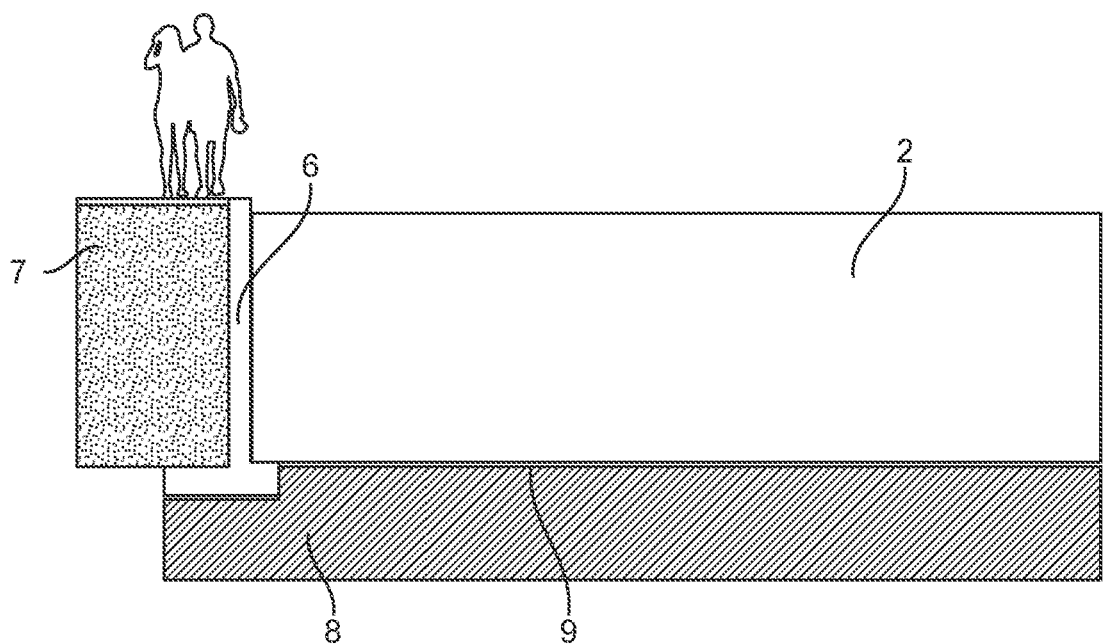
Figure 5:
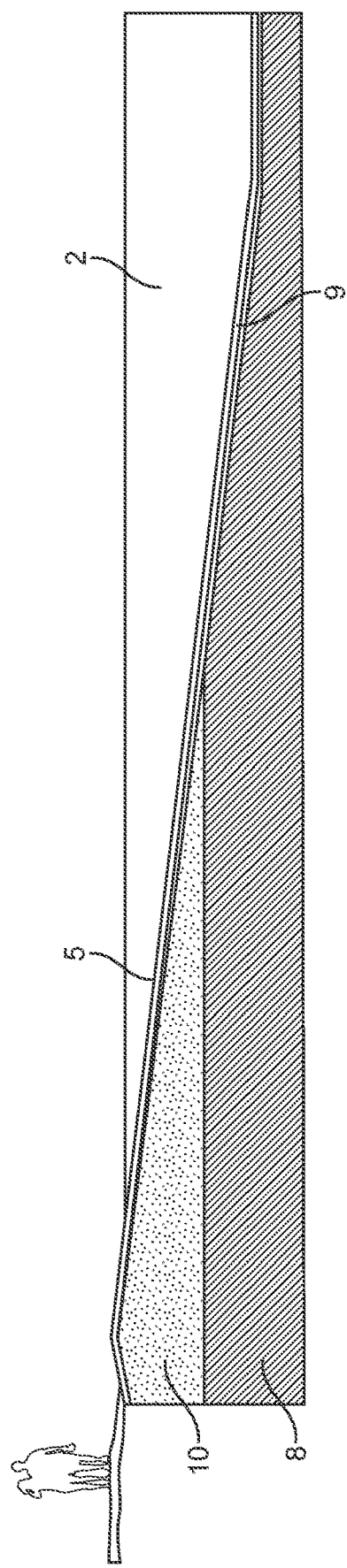
FIG. 5 illustrates an embodiment in which the depth of the lagoon 2 near the wall is relatively shallow. Next
Figure 6:
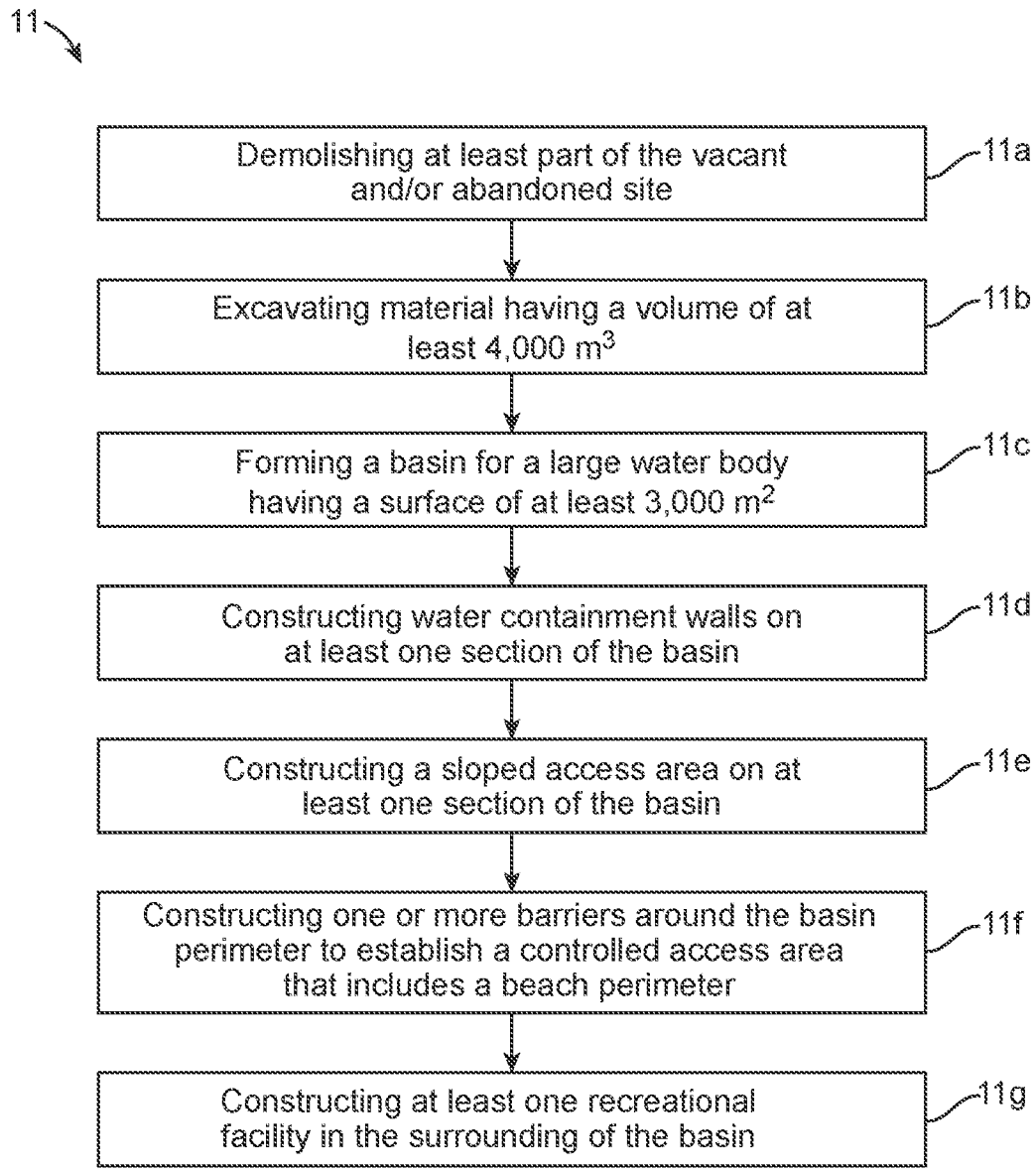
FIG. 6 shows a preferred construction method 11 in accordance with the principles of the present invention. The first step 11a is to demolish at least part of the vacant and/or abandoned site. The next step 11b is to excavate materials having a volume of at least 4,000 m3. Then at step 11c a basin is formed for large water body having a surface area of at least 3,000 m2, this may include in part earthworks from the excavated material and/or from additional materials brought to the site. At step 11d, water containment walls are constructed on at least one section of the basin. At step 11e, a sloped access area in at least one section of the basin is optionally created in the event a swimming area is included. At 11f, barriers are constructed around the basin perimeter to establish a controlled access area for a beach or other area in which user controlled access is desired. At step 11g, at least one additional recreational facility is constructed.

The method from the present invention, as seen in FIG. 2, allows to, in an innovative way, transform vacant or abandoned sites that are located in urban areas and generally have good connectivity, in order to provide beautiful beach-like settings that can help solving the need for more recreational urban open air spaces and tourism needs with a lower carbon footprint and therefore become a completely new and radical trend that can change the lifestyle of people around the world. The present invention helps solving the need for providing recreational settings with activities that can change the lifestyle of urban population around the world while at the same time helps solving the problem associated with vacant or abandoned lots and its negative effects over the community.

The present invention relates generally to an urban transformation and construction method for creating a controlled access tropical-style swimming lagoon with crystal clear turquoise waters and with beaches at vacant or abandoned sites, for swimming and the practice of water sports, wherein a portion of the vacant or abandoned site is demolished in order to generate a swimming lagoon according to designs, construction parameters and configurations. Preferably, there is at least an area of the swimming lagoon where public access is controlled, and a beach area is located within the controlled access area.

The present invention discloses a construction method for creating a tropical style swimming lagoon in vacant or abandoned sites to repurpose such spaces by creating a recreational venue with at least one tropical-style swimming lagoon and additional amenities.

The construction method from the present invention is low cost compared to the construction of other facilities in the same spaces such as shopping malls, amusement parks, water parks, or similar installations.

As used herein, tropical-style refers to clear water lagoons with round shapes, that are suitable for direct contact recreational purposes, and that usually have turquoise colored crystal clear waters and that do not have visible macro algae presence or a green water tonality like artificial lagoons and lakes located in parks and golf courses, among others.

In more detail, the process comprises excavating at least a portion of the vacant or abandoned site to excavate a layer of between 15 cm to 6 meters in order to provide the necessary excavated volume for the swimming lagoon construction.

Optionally, if there are permanent or rigid structures within the site, especially in the case of abandoned lots, demolition can be performed of such structures to allow excavation necessary to build the swimming lagoon. To provide clarity, for the purposes of this application the term demolishing encompasses not only knocking down or tearing down current structures or installations, but also removing debris or non-fixed materials from such zone and digging or excavating a portion of the land as part of the construction method.

The demolition process comprises excavation with machinery up to a depth of 20 centimeters over the final excavation level, where the final 20 cm may be excavated manually.

Once the design excavation level is achieved, the bottom soil must be compacted to achieve a 95% Modified Proctor Density. A 95% Modified Proctor Density means that the soil at the bottom is compacted to 95% of its maximum dry density. This aims to reduce post-construction settlements rates of such soil. As a reference, the Modified Proctor test uses a 4-inch-diameter mold which holds 1/30 cubic feet of soil, and uses a 10 lb. hammer falling through 18 inches, with 25 blows on each of five lifts, for a compaction effort of about 56,250 ft-lb/ft3. This can also be explained such that the bottom of the excavations are to be compacted to a 95% of the Maximum Dry Compacted Density, based on the Modified Proctor test (ASTM D1557-02) when the soil type has more than a 12% material passing under a N°200 mesh (opening of 0.075 mm). When the soil type has less than a 12% material passing under a N°200 mesh (opening of 0.075 mm), the soil must be compacted to achieve no less than 80% of its Relative Density.

The process also includes excavating a volume of at least 4,000 m3, preferably at least 7,000 m3 from an area within the vacant or abandoned site. This excavation material preferably will serve as the earthworks necessary to provide the basin of the swimming lagoon, wherein such earthworks are created within the property perimeter, and wherein the basin includes a basin perimeter and a bottom. It will be appreciated by those of skill in the art that the excavated material may prove to be unsuitable for the earthworks. For example, the material may include a mixture of rocks, cement, tar or other detritus. In such an event, suitable fill and other materials may be brought to the site for the earthworks.

The basin for the lagoon is preferably designed and constructed so that its surface area is at least 3,000 m2, preferably at least 5,000 m2, and more preferably over 10,000 m2 and its deepest point has a minimum depth of 1.4 meters.

It's important to highlight that for the tropical-style swimming lagoon of the present invention, since it has a surface larger than 3,000 m2, conventional swimming pool construction technologies are seldom economically and technically feasible, as for example swimming pool construction requires to have a large and thick concrete structure that comprises a series of inlets and outlets within the walls and bottom of the structure in order to be able to create water movement and circulation that allows to filter the complete water volume at least once per day. This is mainly to have a homogeneous water body so that when withdrawing and filtering the water flow means that the whole water volume is being filtered and there are no dead areas that have no water circulation and would therefore not be filtered efficiently.

For example, regulations for swimming pools around the world require the use of bottom and/or wall nozzles, wherein regulations preferably require the use of bottom inlets to be able to generate proper mixing and circulation of water before it is withdrawn from the pool to send to the filtration system. For example, Florida's swimming pool construction regulations require that inlets be installed so that spacing between floor inlets does not exceed 20 ft. (6 m) and the distance between a bottom inlet and a wall does not exceed 10 ft. (3 m). This means that a 25 m×50 m Olympic pool for example would require more than 35 bottom inlets, and a 3,000 m2 (60 m×60 m) swimming pool would require more than 70 bottom inlets, in addition to wall inlets that would further allow mixing the water volume so that when withdrawing water from the main drains, skimmers, or other withdrawal points and sending such water to the filtration system, it effectively allows to filter the complete water volume of the pool from 1 to 6 times per day (generally 4 times per day based on regulations). The present invention preferably requires that the swimming lagoon has at least 50% less inlets than those required for the filtration system of a conventional swimming pool according to swimming pool standards.

Containment walls are preferably constructed on at least one section of the basin perimeter, as to form a waterfront perimeter that is arranged and configured to contain the water within the basin. Such containment walls require a backfill material in order to provide structural integrity to such walls.

In addition, a sloped area is preferably constructed in at least one section of the basin perimeter in order to create a beach access perimeter. The sloped area is constructed such that the slope of the beach access perimeter is between 5% and 30%. The sloped area may require construction or placement of a support slab in order to provide structural stability on such location. As an example, a support slab can be built out of reinforced concrete, shotcrete, plastics, or other support materials. For example, the sloped area may have high foot traffic of users accessing the swimming lagoon.

The shape of the waterfront perimeter is preferably curved to create a more natural aspect of the swimming lagoon. Additionally, the basin has a maximum width of 300 meters at its widest point. The width of the lagoon is defined as the measurement or extent of the lagoon from side to side; the lesser of the two dimensions of the lagoon measurements. The length of the lagoon is defined as the largest dimensional measurement of the lagoon.

The maximum width of the lagoon is limited in up to 300 meters, as there is little visual impact of the whole lagoon to be gained at eye level with larger distances.

The bottom of the basin is covered with a non-permeable material, in order to act as a water containment structure. The non-permeable bottom material that covers the bottom of the basin comprises plastic liners, shotcrete, or flexible materials that do not require the use of a thick concrete layer like conventional swimming pools. The use of large surfaces of thick concrete is problematic, as in addition of having high costs, it can generate structural tensions that cause fractures, cracks, settlements in the concrete and may impact the structural properties of the basin.

In a preferred embodiment, the non-permeable material comprises a plastic liner of at least 1 mm of thickness, among other solutions. The plastic liner can have different colors and tonalities, but preferably it has a white, blue or light color which provides an intense turquoise tonality of the water body.

Therefore, the basin, along with its containment walls and/or sloped areas creates a swimming lagoon in the previously excavated volume that forms the basin.

Embodiments herein are directed to a swimming lagoon that is arranged and configured to optimize visitor experience. Specifically, the lagoon is arranged and configured in a way such that the relationship between all elements and purposes of the different areas of the lagoon enable guests and visitors to enjoy the experience as well as interact with the different areas that may be designated for different purposes. A beach area included in the swimming lagoon is preferred. However, there may be instances when a sloped beach access with a swimming area is impractical or is otherwise not desired for the specific site.

Further, the swimming lagoon is also preferably constructed in a manner so that it can be used not only for swimming purposes, but also for the practice of several water sports, such as kayaking, stand-up-paddling, boating, water skiing, among others.

Although the swimming lagoon is man-made, it preferably includes shapes that tend to imitate natural geometries, and comprises a slightly elongated shape to provide visitors with at least one vantage point to experience dramatic views of the lagoon and its surroundings. Preferably, the swimming lagoon is surrounded by vegetation such as plants and trees.

Additionally, the swimming lagoon comprises different elements and areas for providing an optimized visitor experience, preferably including at least one controlled access area. This is achieved by constructing one or more barriers around the basin perimeter of the swimming lagoon, in order to cordon off an area of the swimming lagoon to establish a controlled access area with a restricted access swimming lagoon located within. In that case, the controlled access area includes at least one beach access perimeter within the basin perimeter, thereby providing a new recreational amenity and venue for visitors. The barriers comprise at least one access point to selectively allow users into the controlled access area. The remaining area about the basin perimeter can optionally be an open access area, meaning that is a non-ticketed area, that is freely accessed by users. However, the controlled access area preferably requires a ticket, voucher or other payment of an entry fee for accessing such area which can be included within other fees or payments for example access can be included in seasonal tickets, or by being member of an association or group, being included as part of lodging facilities, among others.

Controlled access areas may be created about the swimming lagoon for other purposes as well. However, in the case there are non-ticketed areas, it is important to include separate access points for both controlled access areas and non-ticketed access areas of the lagoon. This enables visitors to clearly participate in either one or both areas depending on their purpose for visiting the site and lagoon, including natural articulations and man-made focal points along the edge to encourage walkability and foster visitors with a sense of discovery. The swimming lagoon can be illuminated through a lighting system, in order to allow nighttime uses. The lighting system comprises exterior lighting systems and/or underwater systems.

As previously mentioned, it is preferred that the lagoon include at least one controlled access area for visitors for at least one beach area, wherein the beach area comprises a sandy beach and sloped transition into the swimming lagoon. The controlled access area may be designed such that the total beach area to lagoon area ratio is at least 1:2. Further, the beach area is preferably placed and designed considering general summer sun orientation, optimizing visitor experience In another embodiment of the invention, the controlled access area surrounds the entire lagoon surface, and may include additional amenities within the controlled access area, such as recreational facilities including cafes, bars, restaurants, and others.

In an embodiment of the invention, the installations surrounding the tropical-style lagoon is artificially set with a beach theme, including the use of blue and white colors with the inspiration of the beach and beach kiosks and lighthouses.

The swimming lagoon can also be surrounded by vegetation such as plants and trees.

The present invention also includes constructing at least one additional recreational facility comprising food and beverage and commercial facilities that can provide a recreational setting surrounding the tropical-style lagoon. Recreational facilities examples comprise restaurants, bars, kiosks, stores, cafes, restaurants, beach centers, promenades, hotels, entertainment facilities, virtual and immersive experiences, and similar facilities and amenities.

The construction of an amphitheater in the surroundings of the lagoon and nearby the beach area(s) is also preferred. This creates an opportunity to hold events such as concerts and festivals, among others. Other activities include music on the beach, dining on the beach, and other events on the beach such as weddings and sports events, among many others. The surroundings of the beach may include cafes, bars, restaurants, beach centers, and similar facilities and amenities.

In the case of having a non-ticketed area within the venue, the at least one non-ticketed access area comprises optimized waterfront perimeter surrounding the swimming lagoon that has an unobstructed view of the lagoon and is not directly in front of any beach areas or esplanades that could affect the aesthetics of the landscape. The non-ticketed access area comprises cafes, bars, restaurants, beach centers, promenades, hotels, entertainment facilities, virtual and immersive experiences, and similar facilities and amenities.

A screen may also be provided in the vicinity of the swimming lagoon to broadcast content and house events and shows, and can be located in the same sector as the amphitheaters, to create a new event venue having the swimming lagoon as its backdrop. The screen may also be used for

| | |
|---|---|
| 1 | Vacant or Abandoned Site |
| 2 | Tropical Style Swimming Lagoon |
| 3 | Beach Area |
| 4 | Method from the present invention |
| 5 | Sloped Access |
| 6 | Containment Wall |
| 7 | Backfill |
| 8 | Bottom Soil |
| 9 | Non permeable material |
| 10 | Support slab |
| 11 | Method |

What is claimed is:

1. An urban transformation construction method for creating a tropical-style swimming lagoon with a sloped access at vacant or abandoned sites, the sites having an area and a perimeter, the method comprising:
   a) demolishing at least part of the site area, wherein the demolition process includes excavating a layer of at least 15 cm and up to six meters;
   b) excavating material having a volume of at least 4,000 m3 from the site area;
   c) forming a basin for a large water body having a surface area of at least 3,000 m² and a minimum depth of at least 1.4 meters at its deepest point, wherein earthworks for the basin are created within the site perimeter, and wherein the basin includes a basin perimeter and a bottom;
   d) constructing water containment walls on at least one section of the basin perimeter to form a waterfront perimeter, wherein the shape of the waterfront perimeter includes one or more curves and wherein the basin has a maximum width of 300 meters;
   e) covering at least part of the bottom of the basin with a non-permeable material including a plastic liner, shotcrete, or flexible materials;
   f) constructing a sloped access area on at least one section of the basin perimeter to form a beach access into the basin;
   g) constructing one or more barriers around at least a portion of the basin perimeter to cordon off an area to establish a controlled access area, wherein the controlled access area includes the beach access, and the one or more barriers include at least one access point to selectively allow users into the controlled access area, whereby the beach access is accessible to the users allowed entry into the controlled access area; and
   h) constructing at least one additional recreational facility comprising food and beverage and commercial facilities selected from the group comprising restaurants, bars, kiosks, stores, and cafes, wherein the at least one additional recreational facility is located in the vicinity of the waterfront perimeter;
   thereby transforming the vacant or abandoned sites by constructing the tropical-style swimming lagoon with a sloped access and at least one additional recreational facility, and wherein the sites are selected from the group comprising green areas of projects with low use, land that does not permit construction of high rises or tall buildings, and low usage density lots.

2. The construction method of claim 1, wherein the area around the basin perimeter not located within the controlled access area forms a non-ticketed access area which may be freely accessed by users.

3. The construction method of claim 1, wherein the demolishing step comprises excavation with machinery up to a depth of 20 centimeters over a design excavation level and the final 20 cm are excavated manually.

4. The construction method of claim 1, wherein step b) comprises excavating material having a volume of at least 7,000 m³.

5. The construction method of claim 1, wherein step c) comprises forming the basin for the large water body having a surface area of at least 5,000 m².

6. The construction method of claim 1, wherein
   when the soil type has more than a 12% material passing under a N°200 mesh (opening of 0.075 mm), compacting the bottom soil to achieve a 95% modified proctor density, also referred to as the maximum dry compacted density; and
   when the soil type has less than a 12% material passing under a N°200 mesh (opening of 0.075 mm), compacting the soil to achieve no less than 80% of its relative density.

7. The construction method of claim 1, further comprising placing sand in a portion of the controlled access area and adjacent to the beach access, whereby a sandy beach area is created and wherein the slope of the beach access continues into the basin forming a sloped transition area.

8. The construction method of claim 7, wherein the sloped transition area into the basin forms an angle of between 5% and 30% with the surface of water in the basin.

9. The construction method of claim 8, wherein the sloped access area is constructed with a support slab to provide structural stability.

10. The construction method of claim 1, wherein the basin is used for swimming and water sports, and the site is used for holding shows and events.

11. The construction method of claim 1, wherein the non-permeable material that covers at least a part of the bottom of the basin is a plastic liner having at least 1 mm of thickness.

12. The construction method of claim 11, wherein the plastic liner has a white, blue or light color.

13. The construction method of claim 1, wherein the basin perimeter of the swimming lagoon includes shapes that imitate natural geometries.

14. The construction method of claim 1, wherein separate access points are included for both the controlled access area and for the site, so that users have access to both areas.

15. The construction method of claim 1, wherein the controlled access area is constructed to have an area relative to the area of the basin in a ratio of at least 1:2.

16. The construction method of claim 1, further comprising constructing an amphitheater within the site, wherein the amphitheater is configured to hold events selected from the group comprising concerts and festivals.

17. The construction method of claim 1, further comprising constructing additional buildings and kiosks arranged about the basin perimeter, the additional buildings and kiosks selected from the group comprising cafes, bars, restaurants, beach centers, promenades, hotels, entertainment facilities and, virtual and immersive user experiences.

18. The construction method of claim 1, wherein a non-fixed screen is provided in the vicinity of the swimming lagoon to broadcast content and house events and shows.

19. The construction method of claim 1, further comprising illuminating at least part of the basin of the swimming lagoon with a lighting system.

20. The construction method of claim 1, further comprising locating vegetation comprising plants and trees within the site and around the basin perimeter.

21. The construction method of claim 1, wherein the at least one additional recreational facility is constructed with a beach theme, including the use of blue and white colors.

22. The construction method of claim 1, further comprising constructing the basin of the swimming lagoon with at least 50% less inlets than those required for the filtration system of a conventional swimming pool according to swimming pool standards.

23. The construction method of claim 1, wherein tropical-style swimming lagoon is defined as a clear body of water with curved shapes and that is suitable for direct contact recreational purposes.

24. The construction method of claim 1, wherein the controlled access area requires a ticket, voucher or other payment of an entry fee for ingress into the controlled access area.

25. An urban transformation construction method for creating a tropical-style swimming lagoon with a sloped access at vacant and abandoned property sites, the method comprising:
   a) demolishing at least part of the vacant or abandoned site, wherein the demolition process includes excavating a layer of at least 15 cm and up to six meters;
   b) excavating material having a volume of at least 4,000 m³ from an area within the site;
   c) forming a basin for a large water body having a surface area of at least 3,000 m² and a minimum depth of at least 1.4 meters at its deepest point, wherein earthworks for the basin are created within a perimeter surrounding the site, and wherein the basin includes a basin perimeter and a bottom;
   d) constructing water containment walls on at least one section of the basin perimeter to form a waterfront perimeter, wherein the shape of the waterfront perimeter is mainly curved and the basin perimeter has a maximum width of 300 meters;
   e) covering at least part of the bottom of the basin with a non-permeable material comprising a plastic liner, shotcrete, or flexible materials;
   f) constructing a sloped access area on at least one section of the basin perimeter to form a beach access into the large water body;
   g) constructing one or more barriers around the basin perimeter to establish a controlled access area, wherein the controlled access area includes a beach access perimeter, and the barriers include at least one access point to selectively allow users into the controlled access area, whereby the users allowed entry into the controlled access area are able to use the beach access; and
   h) constructing at least one additional recreational facility comprising food, beverage and commercial facilities selected from the group comprising restaurants, bars, kiosks, stores, and cafes in the vicinity of the waterfront perimeter.

26. The construction method of claim 25, wherein the area about the basin perimeter not located within the controlled access area forms a non-ticketed access area which may be freely accessed by users.

27. The construction method of claim 25, wherein the demolition process comprises excavation with machinery up to a depth of 20 centimeters over the design excavation level, and where the final 20 cm are excavated manually.

28. The construction method of claim 25, wherein step b) comprises excavating material having a volume of at least 7,000 m³.

29. The construction method of claim 25, wherein step c) comprises forming a basin for the large water body having a surface area of at least 5,000 m².

30. The construction method of claim 25, wherein
   when the soil type has more than a 12% material passing under a N°200 mesh (opening of 0.075 mm), the bottom soil must be compacted to achieve a 95% modified proctor density, also referred to as the maximum dry compacted density
   when the soil type has less than a 12% material passing under a N°200 mesh (opening of 0.075 mm), the soil must be compacted to achieve no less than 80% of its relative density.

31. The construction method of claim 25, further comprising placing sand in the surroundings of the beach access, whereby a sandy beach area is created.

32. The construction method of claim 31, wherein the controlled access area is designed so that the total sandy beach area to swimming lagoon area ratio is at least 1:2.

33. The construction method of claim 25, the beach access having a sloped transition into the basin of between 5% and 30%.

34. The construction method of claim 25, whereby the lagoon is used for swimming, the practice of water sports, and for conducting shows and events.

35. The construction method of claim 25, wherein the sloped access area is constructed with a support slab to provide structural stability.

36. The construction method of claim 25, wherein the non-permeable material that covers the bottom of the basin comprises a plastic liner of at least 1 mm of thickness.

37. The construction method of claim 36, wherein the plastic liner has a white, blue or light color.

38. The construction method of claim 25, wherein the basin perimeter of the swimming lagoon has shapes that tend to imitate natural geometries.

39. The construction method of claim 25, wherein separate access points are included, for both controlled access areas and non-ticketed access areas, whereby visitors can participate in either one or both areas depending on their purpose for visiting the swimming lagoon.

40. The construction method of claim 25, wherein the surroundings of the swimming lagoon include amphitheaters to hold events selected from the group comprising concerts, theatrical events, lectures, and festivals.

41. The construction method of claim 25, wherein the surroundings of the swimming lagoon include cafes, bars, restaurants, beach centers, promenades, hotels, entertainment facilities, and virtual and immersive experiences.

42. The construction method of claim 25, wherein a non-fixed screen is provided in the vicinity of the swimming lagoon on which to display live and streamed content, events and shows.

43. The construction method of claim 25, wherein the swimming lagoon is illuminated through a lighting system.

44. The construction method of claim 25, wherein the swimming lagoon is surrounded by vegetation comprising plants and trees.

45. The construction method of claim 25, wherein the installations surrounding the tropical-style lagoon include a beach theme style, including the use of blue and white colors.

46. The construction method of claim 25, wherein the tropical style swimming lagoon has at least 50% less inlets than those required for the filtration system of a conventional swimming pool according to swimming pool standards.

* * * * *